United States Patent [19]

Kalnoki-Kis

[11] 3,993,501

[45] Nov. 23, 1976

[54] NONAQUEOUS ELECTROCHEMICAL CELL

[75] Inventor: Tibor Kalnoki-Kis, Westlake, Ohio

[73] Assignee: Union Carbide Corporation, New York, N.Y.

[22] Filed: Mar. 24, 1975

[21] Appl. No.: 561,206

[52] U.S. Cl. .................................. 429/48; 429/212
[51] Int. Cl.² ........................................ H01M 10/00
[58] Field of Search............ 136/6 LN, 6 LF, 100 R, 136/20, 19, 86 A, 146, 137

[56] References Cited
UNITED STATES PATENTS

| 3,098,770 | 7/1963 | Horowitz et al. | 136/100 R |
| 3,438,912 | 4/1969 | Tsukamoto et al. | 136/146 X |
| 3,573,106 | 3/1971 | Johnson et al. | 136/146 X |
| 3,836,403 | 9/1974 | Gaines | 136/100 R X |
| 3,864,168 | 2/1975 | Casey et al. | 136/6 LN |
| 3,891,457 | 6/1975 | Auborn | 136/6 LN |
| R22,065 | 4/1942 | Young | 136/111 |

FOREIGN PATENTS OR APPLICATIONS

| 1,376,423 | 12/1974 | United Kingdom |
| 848,855 | 9/1960 | United Kingdom |

Primary Examiner—John H. Mack
Assistant Examiner—C. F. Lefevour
Attorney, Agent, or Firm—Cornelius F. O'Brien

[57] ABSTRACT

A nonaqueous cell comprising an active metal anode, such as a lithium, sodium, potassium or aluminum anode, a liquid cathode-electrolyte comprising a solute dissolved in a solvent which is an oxyhalide of an element of Group V or group VI of the Periodic Table and wherein the surface of the anode contacting the cathode-electrolyte is coated with a vinyl polymer film.

10 Claims, No Drawings

NONAQUEOUS ELECTROCHEMICAL CELL

FIELD OF THE INVENTION

The invention relates to nonaqueous cells employing an active metal anode in conjunction with an oxyhalide cathode-electrolyte wherein the active metal is coated with a vinyl polymer film.

BACKGROUND OF THE INVENTION

The development of high energy battery systems requires, among other things, the compatibility of an electrolyte possessing desirable electrochemical properties with highly reactive anode materials, such as lithium or the like. The use of aqueous electrolytes is precluded in these systems since the anode materials are sufficiently active to react with water chemically. It has, therefore, been necessary, in order to realize the high energy density obtainable through use of these highly reactive anodes, to turn to the investigation of nonaqueous electrolyte systems.

The term "nonaqueous electrolyte" as used herein refers to an electrolyte which is composed of a solute, such as, for example, a metal salt or a complex salt of Group I-A, Group II-A, or Group III-A elements of the Periodic Table, dissolved in an appropriate nonaqueous solvent. The term "Periodic Table" as used herein refers to the Periodic Table of Elements as set forth on the inside back cover of the Handbook of Chemistry and Physics, 48th Edition, The Chemical Rubber Co., Cleveland, Ohio, 1967–1968.

A multitude of solutes is known and many have been suggested for use but the selection of a suitable solvent has been particularly troublesome. The ideal battery electrolyte would comprise a solvent-solute pair which has a long liquid range, high ionic conductivity and stability. A long liquid range, i.e., high boiling point and low freezing point, is essential if the battery is to operate at other than normal ambient temperatures. High ionic conductivity is necessary if the battery is to have high rate capability. Stability is necessary with the electrode materials, the materials of cell construction, and the products of the cell reaction to provide long shelf life when used in a primary or secondary battery system.

It has recently been disclosed in the literature that certain materials are capable of acting both as an electrolyte carrier, i.e., as solvent for the electrolyte salt, and as the active cathode for a non-aqueous electrochemical cell. U.S. Pat. Nos. 3,475,226, 3,567,515 and 3,578,500 each disclose that liquid sulfur dioxide or solutions of sulfur dioxide and a co-solvent will perform this dual function in nonaqueous electrochemical cells. While these solutions perform their dual function, they are not without several disadvantages in use. Sulfur dioxide is always present and, being a gas at ordinary temperatures, it must be contained in the cell as a liquid under pressure or dissolved in a liquid solvent. Handling and packaging problems are created if the sulfur dioxide is used alone, and an additional component and assembly step is necessary if sulfur dioxide is to be dissolved in a liquid solvent. As stated above, a long liquid range encompassing normal ambient temperatures is a desirable characteristic in an electrolyte solvent. Obviously, sulfur dioxide is deficient in this respect at atmospheric pressure.

U.S. application Ser. No. 439,521 by G. E. Blomgren et al, filed Feb. 4, 1974, which is a continuation-in-part of application Ser. No. 212,582 filed on Dec. 27, 1971 now abandoned, discloses a nonaqueous electrochemical cell comprising an anode, a cathode collector and a cathode-electrolyte, said cathode-electrolyte comprising a solution of an ionically conductive solute dissolved in an active cathode depolarizer wherein said active cathode depolarizer consists of a liquid oxyhalide of an element of Group V or Group VI of the Periodic Table. Although oxyhalides can be used effectively as a component part of a cathode-electrolyte in conjunction with an active metal anode, such as a lithium anode, to produce a good high energy density cell, it has been observed that if the cell is stored for a prolonged period of about 3 days or longer, passivation of the anode appears to occur which results in undesirable voltage delays at the beginning of discharge along with high cell impedance.

One of the primary objects of this invention is to substantially prevent the passivation of the active metal anode in oxyhalide cathode-electrolyte cells.

Another object of this invention is to provide an oxyhalide cathode-electrolyte cell wherein the surface of the active metal anode of the cell that is in contact with the liquid oxyhalide cathode-electrolyte is coated with a thin adherent vinyl polymer film so as to prevent the passivation of the active metal anode during cell storage and usage.

Another object of this invention is to provide a lithium-oxyhalide cell system wherein the surface of the lithium anode that is in contact with the liquid oxyhalide cathode-electrolyte of the cell is coated with a thin adherent vinyl polymer film so as to prevent the passivation of the lithium anode during cell storage and usage.

SUMMARY OF THE INVENTION

The invention provides an improved high energy density nonaqueous cell comprising an active metal anode, a cathode collector and an ionically conductive cathode-electrolyte solution consisting essentially of a solute dissolved in a liquid oxyhalide of an element of Group V or Group VI of the Periodic Table, with or without a reactive or non-reactive cosolvent, and wherein the surface of the active metal anode that is in contact with the electrolyte is coated with a thin adherent vinyl polymer film. It is also within the scope of this invention to have the vinyl coating serve the dual function of substantially preventing passivation of the anode while also serving as the sole separator of the cell or permitting the use of a thinner separator than would be normally required for cell use.

The term "vinyl polymer" as used herein encompasses polymers in which the monomeric units are the same as one another (i.e., homopolymers) or different from one another (i.e., copolymers).

The liquid oxyhalides of the element of Group V or Group VI of the Periodic Table are liquid active reducible cathode materials (depolarizer). As used herein and as disclosed in an article titled "Electrochemical Reactions in Batteries" by Akiya Kozawa and R. A. Powers, in the Journal of Chemical Education — Vol. 49, pages 587 to 591, Sept. 1972 edition, a cathode depolarizer is the cathode reactant and, therefore, is the material electrochemically reduced at the cathode. The cathode collector is not an active reducible material and functions as a current collector plus electronic conductor to the cathode terminal of a cell. In other words, the cathode collector is a situs for the electrochemical reduction reaction of the active cathode material and the electronic conductor to the cathode terminal of a cell.

A liquid active reducible cathode material (depolarizer) can either be employed by itself in an electrochemical device (i.e. galvanic cell), mixed with a conductive solute which is a non-reactive material but is added to improve conductivity of the liquid active reducible cathode materials, or mixed with both a conductive solute and a reactive or non-reactive cosolvent material. A reactive cosolvent material is one that is electrochemically active and, therefore, functions as an active cathode material while a non-reactive cosolvent material is one that is electrochemically inactive and, therefore, cannot function as an active cathode material.

Any compatible solid which is substantially electronically conductive will be useful as a cathode collector in the cells of the present invention.

It is desirable to have as much surface contact as possible between the cathode-electrolyte and the collector. It is, therefore, preferred to employ a porous collector since it will provide a high surface area interface with the liquid cathode electrolyte. The collector may be metallic and may be present in any physical form such as a metallic film, screen or a pressed powder. Preferably, however, a pressed powder collector should be at least partially of carbonaceous or other high surface area material.

The solute may be a simple or double salt which will produce an ionically conductive solution when dissolved in the solvent. Preferred solutes are complexes of inorganic or organic Lewis acids and inorganic ionizable salts. The only requirements for utility are that the salt, whether simple or complex, be compatible with the solvent being employed and that it yield a solution which is ionically conductive. According to the Lewis or electronic concept of acids and bases, many substances which contain no active hydrogen can act as acids or acceptors of electron doublets. The basic concept is set forth in the chemical literature (Journal of the Franklin Institute, Vol. 226 — July/December, 1938, pages 293–313 by Lewis).

A suggested reaction mechanism for the manner in which these complexes function in a solvent is described in detail in U.S. Pat. No. 3,542,602 wherein it is suggested that the complex or double salt formed between the Lewis acid and the ionizable salt yields an entity which is more stable than either of the components alone.

Typical Lewis acids suitable for use in the present invention include aluminum fluoride, aluminum bromide, aluminum chloride, antimony pentachloride, zirconium tetrachloride, phosphorus pentachloride, boron fluoride, boron chloride and boron bromide.

Ionizable salts useful in combination with the Lewis acids include lithium fluoride, lithium chloride, lithium bromide, lithium sulfide, sodium fluoride, sodium chloride, sodium bromide, potassium fluoride, potassium chloride and potassium bromide.

It will be obvious to those skilled in the art that the double salts formed by a Lewis acid and an inorganic ionizable salt may be used as such or the individual components may be added to the solvent separately to form the salt or the resulting ions in situ. One such double salt, for example, is that formed by the combination of aluminum chloride and lithium chloride to yield lithium aluminum tetrachloride.

In accordance with the present invention, there is provided a nonaqueous electrochemical system comprising an active metal anode, a cathode collector and a cathode-electrolyte, said cathode-electrolyte consisting essentially of a solute dissolved in an active reducible cathode solvent of an oxyhalide of a Group V or Group VI element of the Periodic Table with or without a cosolvent. The active reducible electrolyte solvent performs the dual function of acting as solvent for the electrolyte salt and as an active cathode depolarizer of the cell. The term "cathode-electrolyte" is used herein to describe electrolytes containing solvents that can perform this dual function.

The use of a single component of the cell as both an electrolyte carrier and active cathode depolarizer is a relatively recent development since previously it was generally considered that the two functions were necessarily independent and could not be served by the same material. For an electrolyte carrier to function in a cell, it is necessary that it contact both the anode and the cathode depolarizer so as to form a continuous ionic path therebetween. Thus it has generally been assumed that the cathode must never directly contact the anode and, therefore, it appeared that the two functions were mutually exclusive. However, it has recently been discovered that certain active cathode materials, such as the liquid oxyhalides, do not appreciably react chemically with an active anode metal at the interface between the metal and the cathode material, thereby allowing the cathode material to contact the anode directly and act as the electrolyte carrier. While the theory behind the cause of the inhibition of direct chemical reaction is not fully understood at the present time, and the applicant does not desire to be limited to any theory of invention, it appears that direct chemical reaction is inhibited either by an inherently high activation energy of reaction or the formation of a thin, protective film on the anode surface. Any protective film on the anode surface must not be formed to such an excess that a large increase in anode polarization results.

Although the active reducible liquid oxyhalides inhibit the direct reaction of active metal anode surfaces sufficiently to permit them to act as both the cathode material and as the electrolyte carrier for nonaqueous cells, they do cause formation of a surface film on the active metal anode during cell storage particularly at elevated temperatures, which consists of a rather heavy layer of crystalline material. This crystalline layer appears to cause passivation of the anode which results in voltage delay on initial discharge along with high cell impedance values in the range of 11 to 15 ohms for a standard C-size cell.

The extent of anode passivation can be measured by observing the time required for the closed circuit voltage of the stored cell to reach its intended voltage level after discharge has begun. If this delay exceeds 1 second, the anode passivation is considered excessive. What has been observed, for example, in lithium-oxyhalide cell systems is that after a load is applied across the terminals of the cell, the cell voltage immediately drops below the intended discharge level, then increases at a rate depending on the extent of lithium passivation and the current density of discharge.

The exact composition of this layer is not known but it is believed to contain some $Li_2S$, $Li_2SO_3$, $LiCl$, $Li_2O$ and $Li_2CO_3$. The thickness and density of the crystalline layer as well as the size and shape of the crystals were observed to vary with the length of the storage period and also with the temperature during storage, e.g., at low temperatures there is relatively little growth of the crystalline layer as compared to the greater growth of the layer at higher temperatures of about 70° C. It has also been observed that when the oxyhalides such as thionyl or sulfuryl chloride are saturated with SO$_2$ and then placed in a lithium anode cell, a crystalline layer rapidly forms on the lithium surface thereby passivating the lithium.

To substantially prevent this anode passivation which occurs in active metal-oxyhalide cathode-electrolyte cell systems during discharge, the surface of the active metal can be coated with a vinyl polymer film which will adhere to the metal, remain stable and not dissolve in the liquid cathode-electrolyte, and which will not effectively decrease the capacity of the cell during cell storage and discharge, and in some cases will even increase the cell capacity on discharge. Although the applicant does not want to be limited to any theory of invention, it appears that one reason why the vinyl polymers, e.g., vinyl chloride polymers, are stable in the oxyhalide cathode-electrolyte cell system, e.g., lithium-oxyhalide cell system, can be explained as follows. One of the accepted mechanisms of vinyl chloride polymer degradation is dehydrochlorination, i.e., the splitting off of a Cl atom and an H atom to form HCl. This process continues until the electronegativity of the remaining Cl atoms on the polymer is compensated for by the energy of conjugation (i.e., double bond formation) in the polymer. Further degradation then is postulated to take place by a free radical mechanism as follows:

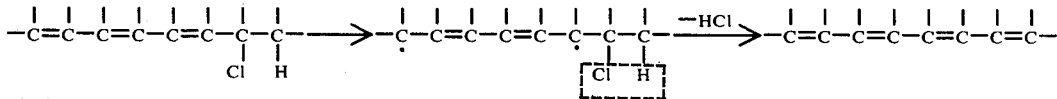

*(indicates free radical)

(·indicates free radical)

Most of the compounds which have been observed to interact or interfere with polymer degradation can be explained by the formation of radicals of the types R·, RO·, ROO· and atomic chlorine. The reaction mechanism by which SO$_2$Cl$_2$ decomposes is assumed to proceed by free radical formation, i.e., Cl· and SO$_2$Cl· as disclosed in an article titled "The Mechanism of the Thermal Decomposition of Sulfuryl Chloride" by Z. G. Szabo and T. Berces, Zeit. fuer Physikalische Chemie Neue Folge 12:168–195 (1952). Thus, following the principle of LeChatelier (chemical equilibrium), the stability of vinyl chloride polymers may be enhanced in such an environment as that prevailing in oxyhalide systems. In other words, if the concentration of any of the degradation products is increased, the reaction equilibrium will be shifted in favor of the original undegraded polymer.

Unsaturated polymeric materials suitable for coating active metal anodes in accordance with this invention may be represented by the following generic formula for the monomeric unit in the polymer:

[CH$_2$ = CR$_x$R$_y$]

where R$_x$ and R$_y$ in one monomeric unit are the same as those of the other monomeric units (homopolymers) or where R$_x$ or R$_y$ in the monomeric unit of one polymer is different from the monomeric unit in the second polymer (copolymers) and where:

R$_x$ is selected from the group consisting of hydrogen, halogens such as Cl and Br, and alkoxy groups containing alkyl groups of 1–5 carbon atoms (e.g., acetoxy); and R$_y$ is selected from the group consisting of halogens such as Cl and Br, and alkoxy groups containing alkyl groups of 1–5 carbon atoms (e.g., acetoxy).

Of the above, R$_x$ and R$_y$ cannot both be H or alkane, alkene, or alkyne groups or combinations thereof, as these would provide no active groups to attach to the lithium. However, R$_x$ and R$_y$ may both be alkoxy groups provided steric hindrance requirements are satisfied. Examples of suitable polymers are vinyl acetate, where the monomeric unit is

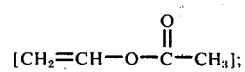

vinyl chloride, where the monomeric unit is

[CH$_2$ = CH-Cl];

and vinylidene chloride, where the monomeric unit is

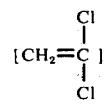

An example of a copolymer would be vinyl chloride-vinyl acetate in which R$_x$ is H in the monomeric unit of both polymers and R$_y$ in the monomeric unit of one polymer is Cl and in the monomeric unit of the second polymer is an acetoxy group.

Polymers for use in this invention must be soluble in a solvent which does not attack the active metal anode such as lithium; must not be degraded or decomposed in the presence of either the solvent used for the coating procedure or the oxyhalide cathode-electrolyte used in the cell; and must form a thin coating which tenaciously adheres to the anode surface in the presence of the cell electrolyte while not interfering with the useful discharge of the cell.

For cell applications, the vinyl polymer film formed on the surface of the anode must be ionically permeable, electronically nonconductive and cathode-electrolyte insoluble.

Although not all of the materials in the above group will have the above-identified characteristics, any artisan can easily select those that do by simply testing the material as a coating on an active metal surface submerged in a liquid oxyhalide electrolyte wherein the oxyhalide is selected from Group V and Group VI of the Periodic Table. For example, polyethylene and polypropylene would not be suitable because they would decompose in liquid oxyhalide.

Suitable vinyl polymer materials for use in this invention can be selected from the group consisting of vinyl chloride-vinyl acetate copolymer, e.g., 86% vinyl chloride — 14% vinyl acetate, and polyvinyl chloride.

The thickness of the vinyl polymer film can vary between about 0.04 mil (0.00004 inch) and about 1.0 mil (0.001 inch) and preferably between about 0.05 mil (0.00005 inch) and about 0.1 mil (0.0001 inch). A film thickness below about 0.04 mil (0.00004 inch) would be ineffective in substantially preventing the passivation of the active metal anode, such as lithium in a lithium-oxyhalide system, while a thickness above about 1.0 mil (0.001 inch) would undesirably increase the internal resistance of the cell. However, when the vinyl polymer film or coating replaces the separator of the cell, its thickness may range up to 10 mils (0.010 inch).

The vinyl polymer film can be applied to the active metal surface by any conventional technique such as spraying, painting or the like with or without a suitable liquid suspending medium. A suitable liquid suspending medium could be the oxyhalide solvents used in the cell as, for example, thionyl chloride ($SOCl_2$) or sulfuryl chloride ($SO_2Cl_2$). Thus, a vinyl polymer such as vinyl chloride-vinyl acetate (86% vinyl chloride and 14% vinyl acetate with a molecular weight ~ 40,000) can be dissolved in thionyl chloride and then applied to the surface of a metal anode either by immersing the metal anode into the solution or by painting or spraying the solution onto the surface of the metal anode. Upon evaporation of the oxyhalide solvent, a tightly adherent, thin film remains on the metal anode surface.

The concentration of the vinyl polymer in the liquid suspending medium can vary widely as long as a film thickness is deposited on the metal anode as specified above. A suitable concentration of the vinyl polymer has been observed to be between about 0.5 to 6.0 weight per cent as based on the weight of the liquid suspending medium. A concentration below 0.5 weight per cent would probably be insufficient to provide an effective film on the metal anode, such as lithium, while a concentration above 6.0 weight per cent would not provide any meaningful additional protection against the metal anode passivation where the vinyl-polymer film is not also used as the separator. When coating a lithium anode using a vinyl chloride-vinyl acetate polymer dissolved in thionyl chloride, it was observed that with concentrations about 6 weight per cent and above, the thickness of the polymer film formed on the lithium anode remained approximately the same, e.g., between 1.3–1.7$\mu$. The reason for this is not fully understood but it is believed that this vinyl polymer forms a thin chemisorbed layer on the lithium surface, i.e., there is believed to be a chemical reaction between the lithium metal and the polymer. This reaction may possibly occur through the carbonyl group or the chloride of the polymer in a manner similar to that taught in U.S. Pat. No. 3,833,458 which covers metal-polymer composites and their methods of preparation. Whatever the theory is, once this thin layer or film covers the lithium surface, the remaining dissolved polymer stays in the solvent. The tightly adherent, thin film of polymer does not redissolve in the oxyhalide electrolyte but remains on the metal anode surface during storage and discharge of the cell even to the point where the metal anode material is substantially completely consumed on discharge.

Although the vinyl polymer for use in this invention can be soluble in a liquid oxyhalide, it must be insoluble in the oxyhalide cathode-electrolyte of the cell, said oxyhalide cathode-electrolyte consisting of a solute dissolved in an oxyhalide of an element of Group V or Group VI of the Periodic Table with or without a cosolvent.

In addition to substantially preventing metal anode passivation in nonaqueous oxyhalide cells, the vinyl polymer film of this invention will provide for a more uniform consumption of the metal anode during discharge and when used as the sole separator of the cells, it will result in a decrease of that portion of the IR losses of the cell attributed to conventional type separators.

The present invention will be further illustrated by the following Examples.

EXAMPLE I

Several specimens of pure lithium foil obtained commercially from the Foote Mineral Co. measuring 1 inch (2.54 cm) by 1.5 inches (3.8 cm) were coated with various concentrations of vinyl chloride-vinyl acetate polymer (obtained commercially from Union Carbide as VYHH consisting of 86% vinyl chloride and 14% vinyl acetate with an average molecular weight of about 40,000) in a liquid suspending medium (solvent) of thionyl chloride ($SOCl_2$). Each lithium sample was immersed in the coating solution for about 1 minute and when withdrawn the solvent was evaporated.

The thickness of the polymer layer formed on each of the lithium samples was measured and is shown in Table 1.

TABLE 1

| *Concentration of VYHH (weight per cent) | Thickness of VYHH layer on the lithium sample (centimeters) |
|---|---|
| 1 | .00012 |
| 3 | .00015 |
| 6 | .00018 |

*Weight per cent as based on weight of solvent

EXAMPLE II

Several lithium samples with and without a vinyl polymer film as prepared in Example I were immersed in a liquid cathode-electrolyte consisting of 1M $LiAlCl_4$ in $SO_2Cl_2$ for various time periods and under various temperature conditions. The aged lithium samples were then placed under a scanning electron microscope and examined for crystalline formation. The results showed that the uncoated lithium foil had a surface crystalline layer, the crystals of which varied in size and shape depending on the time period and temperature conditions of the lithium exposure in the liquid cathode-electrolyte. Specifically, as the temperature increased, the amount of crystalline material formed increased as did the size of the crystals.

Contrary to the above, the vinyl polymer coated lithium samples after being aged in $SO_2Cl_2$ containing 1M $LiAlCl_4$ for 7 days at temperature varying between 45° and 71° C. showed no effective crystalline formation on the surface of the vinyl polymer film. This test demonstratively showed that coating the surface of a lithium surface with a vinyl polymer will prevent the formation of a heavy crystalline deposit which has been associated with lithium passivation in a liquid-cathode-electrolyte such as 1M $LiAlCl_4$ in $SO_2Cl_2$.

EXAMPLE III

C-size round cells were constructed using a stainless steel can which also acted as the anode collector. The inside wall and bottom of the can were lined with a lithium sheet having an internal surface area of about 18 cm² exposed to the cathode-electrolyte and which served as the active anode surface. The cathode collector consisted of a cylinder of porous carbon having an apparent external surface area of about 18 cm². A layer of glass fiber served to electrically insulate the anode walls from the graphite cylinder. A glass fiber disc was placed at the bottom of the cell to give further physical and electrical separation between the carbon cylinder and the lithium anode. The cell was completed by adding 12 milliliters of a 1 molar solution of lithium aluminum tetrachloride in sulfuryl chloride and sealing the cell at the top with a polytetrafluoroethylene cap. The sulfuryl chloride acted both as a soluble cathode depolarizer and as a solvent for the lithium aluminum tetrachloride electrolyte salt.

In some cells, the surface of the anode was coated with an 86% vinyl chloride — 14% vinyl acetate polymer (VYHH) as in Example I. The cells were stored for one month at room temperature whereupon they were then discharged across a 20-ohm load to a cutoff of 2.5 volts. The test data for the cells are shown in Table 3 and clearly demonstrates that the voltage delay is, on the average, shorter and the cell capacity output to 2.5-volt cutoff is greater using the teachings of this invention.

ment of Group V or Group VI of the Periodic Table, the improvement which comprises the surface of the active metal anode that contacts the electrolyte coated with a vinyl polymer film which effectively prevents passivation of the anode during storage, said vinyl polymer film tenaciously adhering to the surface of the anode and being ionically permeable, electronically nonconductive and cathode-electrolyte insoluble.

2. The nonaqueous electrochemical cell of claim 1 wherein the monomeric unit of said vinyl polymer has the formula:

$$[CH_2 = CR_xR_y]$$

wherein $R_x$ is selected from the group consisting of hydrogen, halogens and alkoxy groups containing alkyl groups of 1–5 carbon atoms; and $R_y$ is selected from the group consisting of halogens and alkoxy groups containing alkyl groups of 1–5 carbon atoms.

3. The nonaqueous electrochemical cell of claim 1 wherein said active metal anode is lithium.

4. The nonaqueous electrochemical cell of claim 1 wherein said anode is lithium and said liquid active cathode depolarizer is thionyl chloride.

5. The nonaqueous electrochemical cell of claim 1 wherein said anode is lithium and said liquid active cathode depolarizer is sulfuryl chloride.

6. The nonaqueous electrochemical cell of claim 1 wherein said solute is a complex salt of a Lewis acid and an inorganic ionizable salt.

7. The nonaqueous electrochemical cell of claim 2 wherein the vinyl polymer is selected from the group consisting of vinyl chloride-vinyl acetate copolymer

TABLE 3

| C-Size Cell | Impedance(ohm) Initial | Impedance(ohm) Final | Voltage Delay (Seconds) | Avg. Discharge Voltage to 2.5 V Cutoff | Amp-hrs to 2.5 V Cutoff | Capacity in Wh/in³ to 2.5 V Cutoff |
| --- | --- | --- | --- | --- | --- | --- |
| *Control | 2.98 | 5.47 | 0 | 2.95 | 4.13 | 8.20 |
| " | 3.55 | 7.44 | 18 | 2.99 | 5.24 | 10.49 |
| " | 3.19 | 4.00 | 0 | 3.00 | 4.46 | 8.96 |
| Polymer-Coated Anode | 2.10 | 3.10 | 1 | 3.13 | 6.33 | 13.24 |
| " | 2.01 | 2.80 | 0 | 3.11 | 6.31 | 13.13 |

*Cathode-electrolyte of $SO_2Cl_2$-1M $LiAlCl_4$

While the present invention has been described with reference to many particular details thereof, it is not intended that these details shall be construed as limiting the scope of this invention.

What is claimed is:

1. A nonaqueous electrochemical cell comprising an active metal anode selected from the group consisting of lithium, sodium, potassium and aluminum anodes, a cathode collector and an ionically conductive cathode-electrolyte solution containing a solute dissolved in a liquid oxyhalide active cathode depolarizer of an eleand polyvinyl chloride.

8. The nonaqueous electrochemical cell of claim 7 wherein the vinyl polymer coating has a thickness of between about 0.04 mil and about 10 mils.

9. The nonaqueous electrochemical cell of claim 7 wherein the vinyl polymer coating has a thickness of between about 0.05 mil and about 0.1 mil.

10. The nonaqueous electrochemical cell of claim 8 wherein the vinyl polymer coating is vinyl chloride-vinyl acetate.

* * * * *